(12) United States Patent
Lin (10) Patent No.: US 11,031,047 B2
(45) Date of Patent: Jun. 8, 2021

(54) HARD-DISK PULLING DEVICE

(71) Applicant: CHENBRO MICOM CO., LTD., New Taipei (TW)

(72) Inventor: Sheng-Chan Lin, New Taipei (TW)

(73) Assignee: CHENBRO MICOM CO., LTD., New Taipei (TW)

(*) Notice: Subject to any disclaimer, the term of this patent is extended or adjusted under 35 U.S.C. 154(b) by 0 days.

(21) Appl. No.: 16/737,884

(22) Filed: Jan. 8, 2020

(65) Prior Publication Data

US 2020/0223059 A1 Jul. 16, 2020

(30) Foreign Application Priority Data

Jan. 11, 2019 (TW) ................. 108200564

(51) Int. Cl.
*G11B 33/12* (2006.01)
*G11B 33/02* (2006.01)
*B25J 9/10* (2006.01)

(52) U.S. Cl.
CPC ............ *G11B 33/124* (2013.01); *G11B 33/02* (2013.01); *G11B 33/128* (2013.01); *B25J 9/1065* (2013.01)

(58) Field of Classification Search
None
See application file for complete search history.

(56) References Cited

FOREIGN PATENT DOCUMENTS

| TW | I232078 B | 5/2005 |
|----|-----------|--------|
| TW | M389329 U1 | 9/2010 |
| TW | M401843 U1 | 4/2011 |

*Primary Examiner* — Craig A. Renner
(74) *Attorney, Agent, or Firm* — CKC & Partners Co., LLC (57) ABSTRACT

A hard-disk pulling device includes two separating plates, a cover member, a hook portion and a linkage mechanism. A receiving space is defined between the separating plates for receiving a hard disk unit. The cover member is pivotally connected to one of the separating plates to selectively cover the receiving space. The linkage mechanism includes a first linking rod pivotally connected to the cover member, and a second linking rod pivotally connected to the first linking rod and the separating plate. The hook portion is connected to one end of the linkage mechanism facing away from the cover member for directly abutting against the hard disk unit. When the cover member is rotated to pull the hook portion through the linkage mechanism, the hook portion pushes the hard disk unit out of the receiving space.

10 Claims, 9 Drawing Sheets

HARD-DISK PULLING DEVICE

RELATED APPLICATIONS

This application claims priority to Taiwan Application Ser. No. 108200564, filed Jan. 11, 2019, which is herein incorporated by reference.

BACKGROUND

Field of Disclosure

The disclosure relates to a pulling device. More particularly, the disclosure relates to a hard-disk pulling device.

Description of Related Art

Since the requirement for data storage is gradually increased, a server is able to be loaded with a large number of hard disk units for providing information access services outwardly. For example, a server rack having a single rack unit ("1U") in height size is used to be loaded with a certain number of hard disk units stacked side by side therein. In order to facilitate the maintenance and installation of the hard disk units, each of the hard disk units is usually installed in one removable tray, and then the removable trays are respectively inserted into the server rack. Thus, a user is able to substitute or repair one of the hard disk units by withdrawing the respect the removable tray outwardly.

However, because of the limited width and height of the "1U" server rack, a maximum receiving space of the "1U" server rack has been nearly full so that space utilization of the "1U" server rack and the number of hard disk units are no longer to be effectively improved, thereby hindering the efficiency of the server in providing the information access services.

Therefore, how to develop a solution which not only facilitates the withdrawing of the hard disk units but also improves the storing capacity of the hard disk units so as to improve the foregoing deficiencies and inconvenience is an urgent and important issue for related industry.

SUMMARY

The present disclosure provides a hard-disk pulling device to solve the problems of the prior art.

In one embodiment of the disclosure, a hard-disk pulling device is provided, and includes a first separating plate, a second separating plate, a cover member, a hook portion and a linkage mechanism. A receiving space is defined between the first separating plate and the second separating plate for receiving a hard disk unit. The cover member is pivotally connected to the first separating plate to selectively cover the receiving space. The linkage mechanism includes a first linking rod and a second linking rod. The first linking rod is pivotally connected to the cover member. The second linking rod is pivotally connected to the first linking rod and the first separating plate. The hook portion is connected to one end of the linkage mechanism facing away from the cover member for directly abutting against the hard disk unit. When the cover member is rotated to expose the hard disk unit received in the receiving space, the cover member pulls the hook portion through the linkage mechanism such that the hook portion pushes the hard disk unit out of the receiving space.

According to one or more embodiments of the disclosure, in the foregoing hard-disk pulling device, the second linking rod is formed in an L type, and the second linking rod includes a first rod body and a second rod body connected to the first rod body. An included angle is defined between the first rod body and the second rod body. One end of the first rod body facing away from the second rod body is pivotally connected to the first separating plate, and one end of the second rod body facing away from the first rod body is fixedly connected to the hook portion, and one end of the first rod body facing away from the cover member is pivotally connected to an intersection of the first rod body and the second rod body.

According to one or more embodiments of the disclosure, in the foregoing hard-disk pulling device, the cover member is formed with a lug. The lug is protrudingly located on one side of the cover member, and one end of the first linking rod facing away from the hook portion is pivotally connected to the lug. When the cover member covers the receiving space to conceal the hard disk unit received in the receiving space, the lug is located within the receiving space.

According to one or more embodiments of the disclosure, in the foregoing hard-disk pulling device, the first separating plate is provided with a first sliding slot. The first sliding slot is disposed on one side of the first separating plate facing towards the receiving space. The second separating plate is provided with a plurality of first protruding posts and a plurality of second protruding posts. The first protruding posts are spaced arranged along a long axis direction of the second separating plate, and the second protruding posts are spaced arranged along the long axis direction of the second separating plate, so that a second sliding slot is defined between the first protruding posts and the second protruding posts, and the second sliding slot is arranged opposite to the first sliding slot. Two opposite sides of the hard disk unit are received and supported in the first sliding slot and the second sliding slot, respectively.

According to one or more embodiments of the disclosure, in the foregoing hard-disk pulling device, the cover member is provided with a third sliding slot, the third sliding slot is disposed on one surface of the cover member facing towards the receiving space. When the cover member partially pushes the hard disk unit out of the receiving space, the first sliding slot is connected to the third sliding slot, and one of the opposite sides of the hard disk unit is collectively located in the first sliding slot and the third sliding slot.

According to one or more embodiments of the disclosure, in the foregoing hard-disk pulling device, the cover member has an elastic portion, and the elastic portion is protrudingly located on an inner surface of the cover member. When the cover member covers the receiving space, the elastic portion pushes the hard disk unit into the first sliding slot from the third sliding slot.

According to one or more embodiments of the disclosure, in the foregoing hard-disk pulling device, the hook portion is located aside an imaginary extension line of a long axis direction of the first linking rod.

According to one or more embodiments of the disclosure, in the foregoing hard-disk pulling device, the second linking rod is a linear rod, and the hook portion is directly formed at one end of the first linking rod facing away from the cover member.

According to one or more embodiments of the disclosure, in the foregoing hard-disk pulling device, the cover member is formed with an inner surface and two side surfaces. The inner surface is located between the side surfaces. When the cover member covers the receiving space, the inner surface of the cover member faces towards the receiving space. The first linking rod is provided with a curved portion. The curved portion and the hook portion are respectively located at two opposite ends of the first linking rod, and the curved portion is pivotally connected to one of the side surfaces of the cover member.

According to one or more embodiments of the disclosure, in the foregoing hard-disk pulling device, the cover member further includes a first pivot. The cover member is pivotally connected to the first separating plate through the first pivot. The linkage mechanism further comprises a second pivot, a third pivot and a fourth pivot in which the first linking rod is pivotally connected to the cover member through the second pivot, and pivotally connected to the second linking rod through the third pivot, the second linking rod is pivotally connected to the first separating plate through the fourth pivot, so that the first separating plate, the second linking rod, the first linking rod and the cover member are collectively formed to be a four-bar linkage structure.

Thus, through the construction of the embodiments above, the hard disk unit can be chosen to operate without a removable tray. Thus, even if the receiving space of the server rack is constant, the above-mentioned hard-disk pulling device can not only facilitate the withdrawing of the hard disk units but also improve the storing capacity of the hard disk units, thereby enhancing the efficiency of the server in providing information access services.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
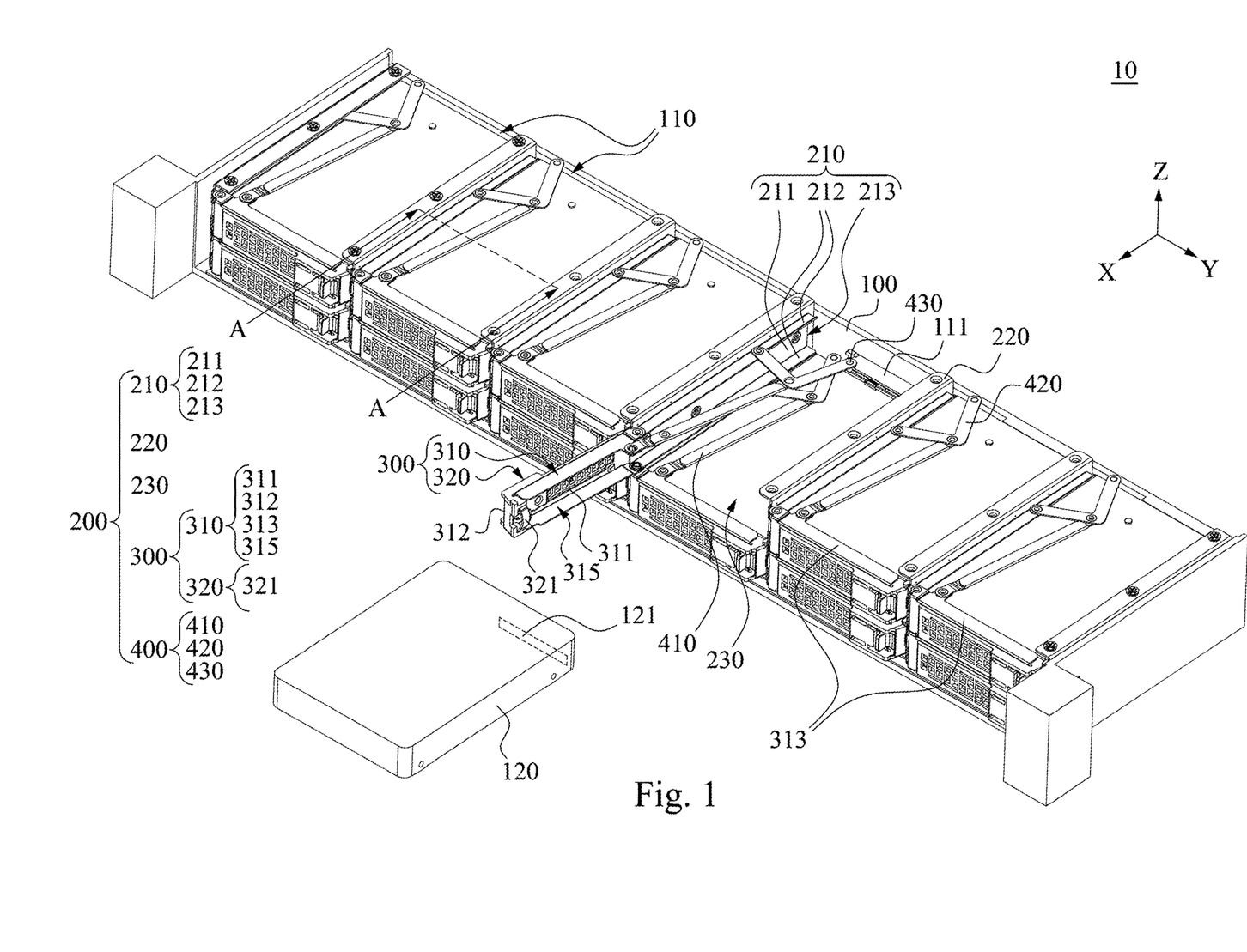
FIG. 1 is a partial exploded view of a server according to one embodiment of the disclosure.
Figure 2:
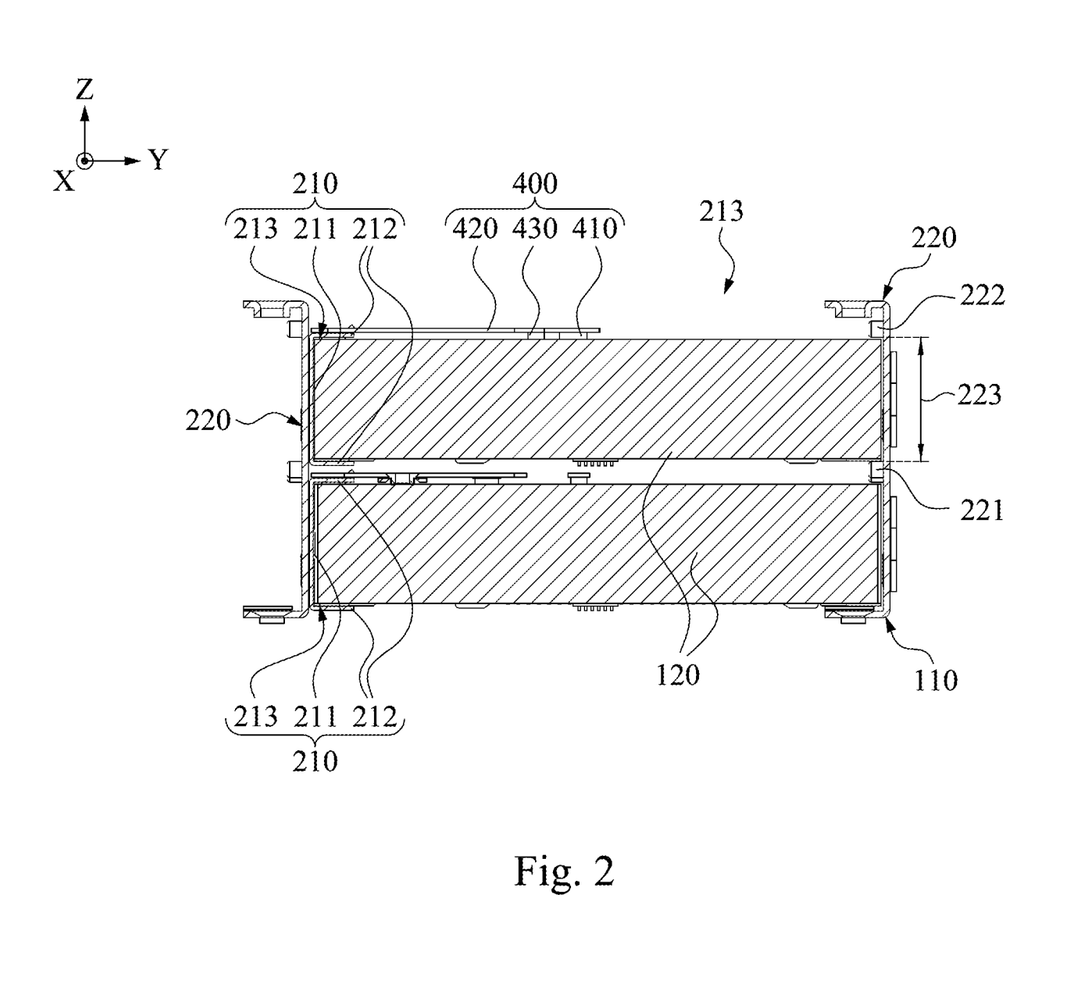
FIG. 2 is a cross-sectional view of the server of FIG. 1 viewed along a line A-A.
Figure 3:
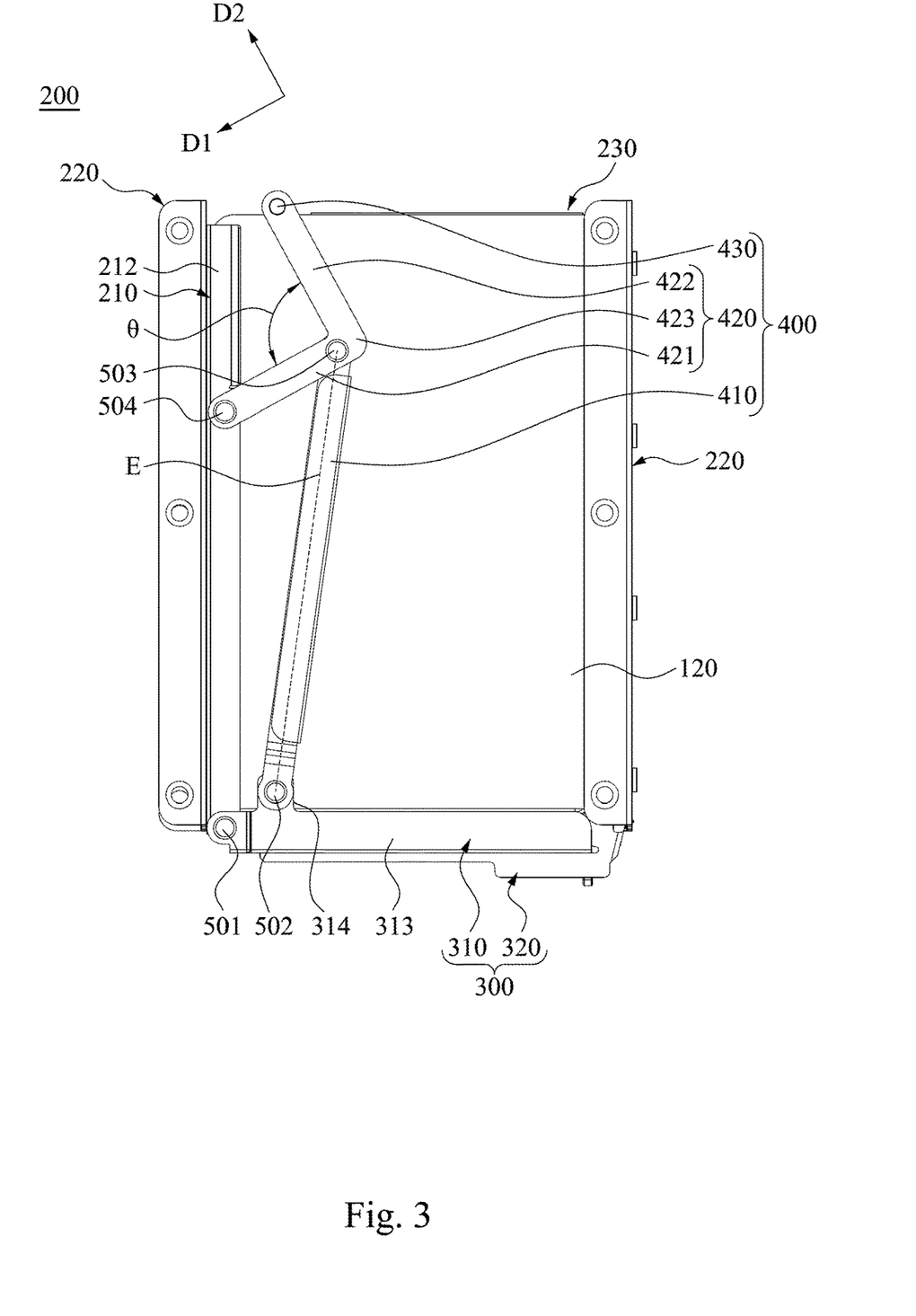
FIG. 3 is a top view of the hard-disk pulling device of FIG. 1.

Reference is now made to FIG. 1 to FIG. 3, in which FIG. 1 is a partial exploded view of a server 10 according to one embodiment of the disclosure, FIG. 2 is a cross-sectional view of the server 10 of FIG. 1 viewed along a line A-A, and FIG. 3 is a top view of the hard-disk pulling device 200 of FIG. 1. As shown in FIG. 1 to FIG. 2, the server 10 includes a rack 100. The rack 100 includes a plurality of accommodating units 110. The accommodating units 110 are stacked in an array (for example, 2×12). However, the disclosure is not limited thereto. Each of the accommodating units 110 is configured to receive a single hard disk unit 120, and each of the accommodating units 110 is provided with a hard-disk pulling device 200. Each of the hard-disk pulling devices 200 is used to facilitate a user to withdraw the hard disk unit 120 received in the accommodating units 110.

As shown in FIG. 2 to FIG. 3, each of the hard-disk pulling devices 200 includes a first separating plate 210, a second separating plate 220, a cover member 300, a linkage mechanism 400 and a hook portion 430. A receiving space 230 is defined between the first separating plate 210 and the second separating plate 220 for receiving one of the hard disk units 120. The cover member 300 is pivotally connected to the first separating plate 210 for rotating to cover or expose the receiving space 230. The linkage mechanism 400 is located within the receiving space 230, and the linkage mechanism 400 includes a first linking rod 410 and a second linking rod 420. The first linking rod 410 is pivotally connected to the cover member 300. The second linking rod 420 is pivotally connected to the first linking rod 410 and the first separating plate 210. The hook portion 430 is connected to one end of the linkage mechanism 400 facing away from the cover member 300 for directly abutting against the hard disk unit 120 received within the receiving space 230.

In the embodiment, as shown in FIG. 2, the first separating plate 210 is provided with a first sliding slot 213. The first sliding slot 213 is disposed on one surface of the first separating plate 210 facing towards the receiving space 230. More specifically, a cross section of the first separating plate 210 is U-shaped, and includes a plate body 211 and two side plates 212. The side plates 212 are respectively disposed on two opposite long sides of the plate body 211 and extend in the same direction. Thus, the aforementioned first sliding slot 213 is collectively defined by the plate body 211 and the side plates 212, and is used to provide the hard disk unit 120 to slide into the aforementioned first sliding slot 213.

The second separating plate 220 is provided with a plurality of first protruding posts 221 and a plurality of second protruding posts 222. The first protruding posts 221 are spaced arranged along a long axis direction (e.g., X axis, FIG. 1) of the second separating plate 220. The second protruding posts 222 are spaced arranged along the long axis direction (e.g., X axis, FIG. 1) of the second separating plate 220, so that a second sliding slot 223 which is located opposite to the first sliding slot 213 is defined between the first protruding posts 221 and the second protruding posts 222. Thus, two opposite sides of the hard disk unit 120 can be received in and supported by the first sliding slot 213 and the second sliding slot 223, respectively. Therefore, the hard disk unit 120 can be directly received in the receiving space 230, however the disclosure is not limited thereto.

The cover member 300 includes a bracket 310 and an external panel 320. The bracket 310 is formed with an inner surface 311, an outer surface 312 and two side surfaces 313. The inner surface 311 and the outer surface 312 are facing away from each other, and located between the side surfaces 313. Thus, when the cover member 300 covers the receiving space 230 to conceal the hard disk unit 120 received in the receiving space 230, the inner surface 311 of the cover member 300 faces towards the receiving space 230. A third sliding slot 315 is collectively defined by the inner surface 311 and the side surfaces 313 of the cover member 300. The external panel 320 is fixedly disposed on the outer surface 312 of the bracket 310. One of the side surfaces 313 is pivotally connected to one of the side plates 212 of the first separating plate 210 through a first pivot 501. Thus, the cover member 300 can be rotated to the second separating plate 220 being relative to the first separating plate 210 so as to cover the receiving space 230 for concealing the hard disk unit 120 received in the receiving space 230.

Furthermore, the cover member 300 is formed with a lug 314. The lug 314 is protrudingly located on one side of the cover member 300, and one end of the first linking rod 410 facing away from the hook portion 430 is pivotally connected to the lug 314. More specifically, the lug 314 is disposed at one end of the side surface 313 closer to the first separating plate 210, and protrudingly formed at one edge of the side surface 313 facing away from the external panel 320. Thus, when the cover member 300 covers the receiving space 230 to conceal the hard disk unit 120 received in the receiving space 230, the lug 314 is located within the receiving space 230, and located above the hard disk unit 120.

Also, the cover member 300 has an elastic portion 321 which is a part of the external panel 320, and is protrudingly located on the inner surface 311 of the bracket 310. Thus, when the cover member 300 is rotated to cover the receiving space 230, the elastic portion 321 pushes the hard disk unit 120 into the first sliding slot 213 from the third sliding slot 315 so as to assist the connection port 121 of the hard disk unit 120 to physically plug into an electrical connecting port 111 installed in the rack 100.

In the embodiment, as shown in FIG. 2 and FIG. 3, the first linking rod 410 is in a linear shape, that is, the first linking rod 410 is a linear rod. One end of the first linking rod 410 is pivotally connected to the lug 314 of the cover member 300 through a second pivot 502. The second linking rod 420 is formed in an L type, and the second linking rod 420 includes a first rod body 421 and a second rod body 422 connected to the first rod body 421. An intersection 423 of the first rod body 421 and the second rod body 422 has an included angle θ that is defined between the first rod body 421 and the second rod body 422. One end of the first rod body 421 is pivotally connected to the first separating plate 210, and one end of the second rod body 422 is fixedly connected to the hook portion 430. More specifically, one end of the second rod body 422 facing away from the first rod body 421 is fixedly connected to the hook portion 430. One end of the first linking rod 410 facing away from the cover member 300 is pivotally connected to the intersection 423 of the first rod body 421 and the second rod body 422 through the third pivot 503. More specifically, both of the first rod body 421 and the second rod body 422 are linear-shaped, that is, each of the first rod body 421 and the second rod body 422 is a linear rod. The included angle θ that is defined between a long axis direction D1 of the first rod body 421 and a long axis direction D2 of the second rod body 422 is between 0-180°. One end of the first rod body 421 facing away from the second rod body 422 is pivotally connected to one of the side plates 212 of the first separating plate 210 through the fourth pivot 504 so that the first separating plate 210, the second linking rod 420, the first linking rod 410 and the cover member 300 are collectively formed to be a four-bar linkage structure.

It is noted, the hook portion 430 may be a bolt or a folding plate, however, the disclosure is not limited thereto. In other embodiments, the hook portion 430 may also be an idling wheel, or integrally formed on the second linking rod 420. In addition, since the hard disk unit 120 is the most common hard disk product, which means that the hard disk unit can be operated without a tray such that the hard disk unit 120 can also be considered as a bare disk or a naked disk.

Furthermore, as shown in FIG. 3, as a long axis direction E of the first linking rod 410 has an imaginary extension line E, and the hook portion 430 is located aside the imaginary extension line E of the first linking rod 410, rather than directly located on the imaginary extension line E of the first linking rod 410.

Figure 4A:
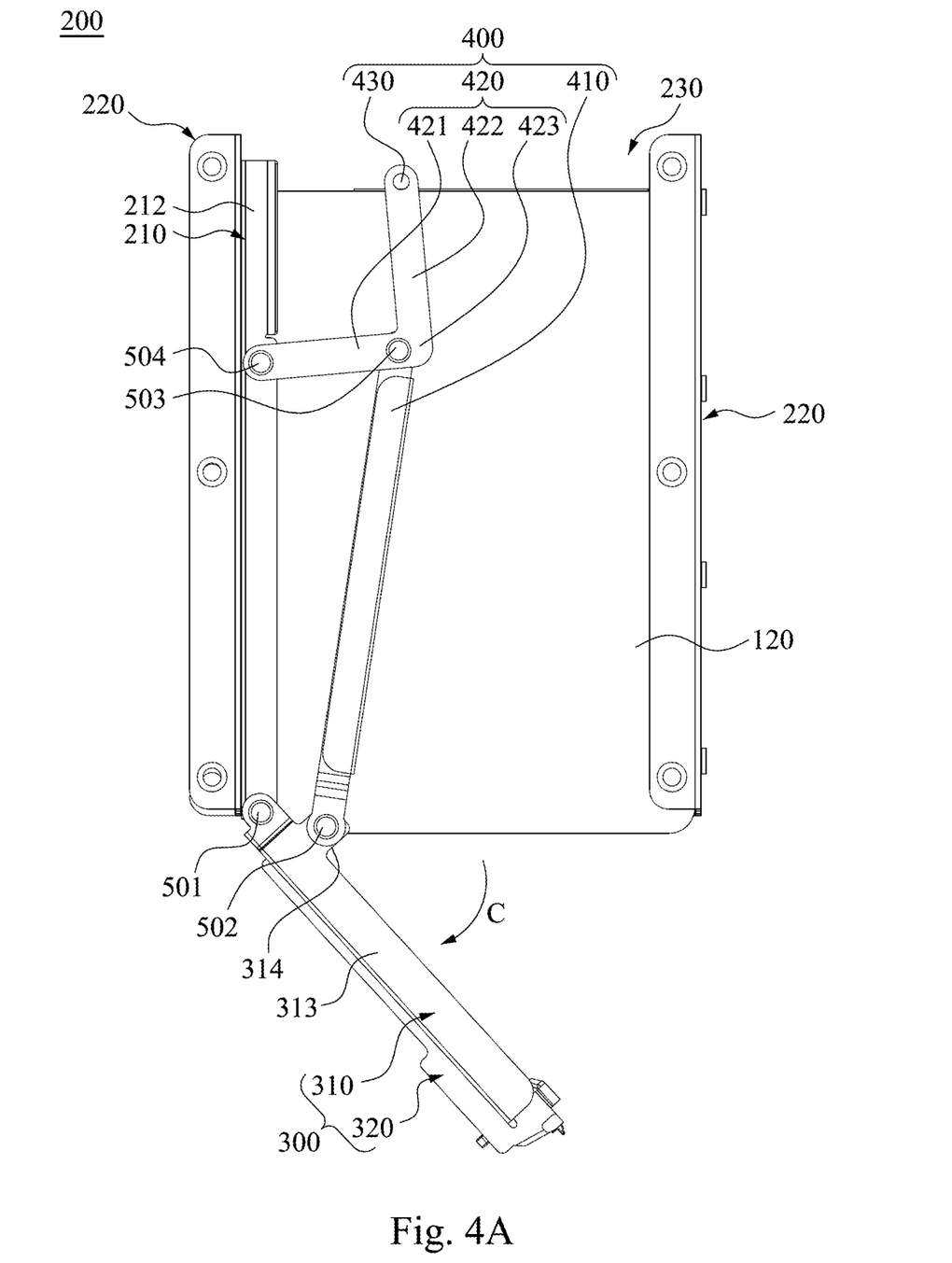
FIG. 4A-FIG. 4B are continuous schematic views expressing the hard-disk pulling device of FIG. 3.

FIG. 4A-FIG. 4B are continuous schematic views expressing the hard-disk pulling device 200 of FIG. 3. As shown in FIG. 3 and FIG. 4A, when a user opens the cover member 300 to rotate the cover member 300 to expose the hard disk unit 120 from the receiving space 230, the cover member 300 pulls the hook portion 430 through the linkage mechanism 400, so that the hook portion 430 pushes the hard disk unit 120 out of the receiving space 230. More specifically, the cover member 300 sequentially pulls the first linking rod 410 and the second linking rod 420, so that the second linking rod 420 starts to be rotated to pull the hook portion 430. Therefore, the hook portion 430 pushes the hard disk unit 120 outwardly.

Figure 4B:
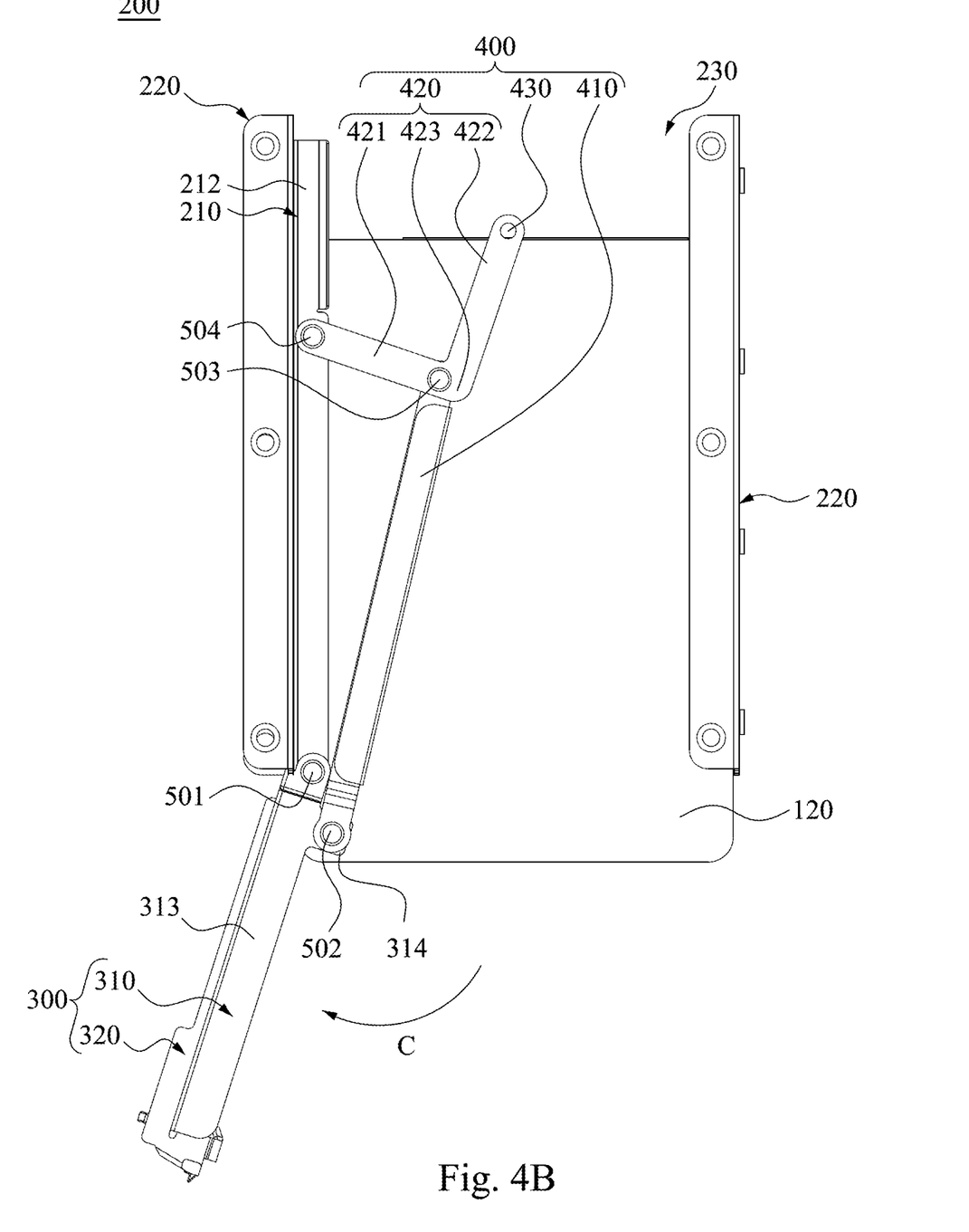

As shown in FIG. 4A and FIG. 4B, when the user continues to rotate the cover member 300 to be further away from the hard disk unit 120 in the receiving space 230, the cover member 300 continues to pull the hook portion 430 through the linkage mechanism 400 so that the hard disk unit 120 starts to move into the third sliding slot 315 from the first sliding slot 213, that is, when the cover member 300 completes the pulling step of the hard disk unit 120, one of the opposite sides of the hard disk unit 120 is collectively located in the first sliding slot 213 and the third sliding slot 315.

Figure 5:
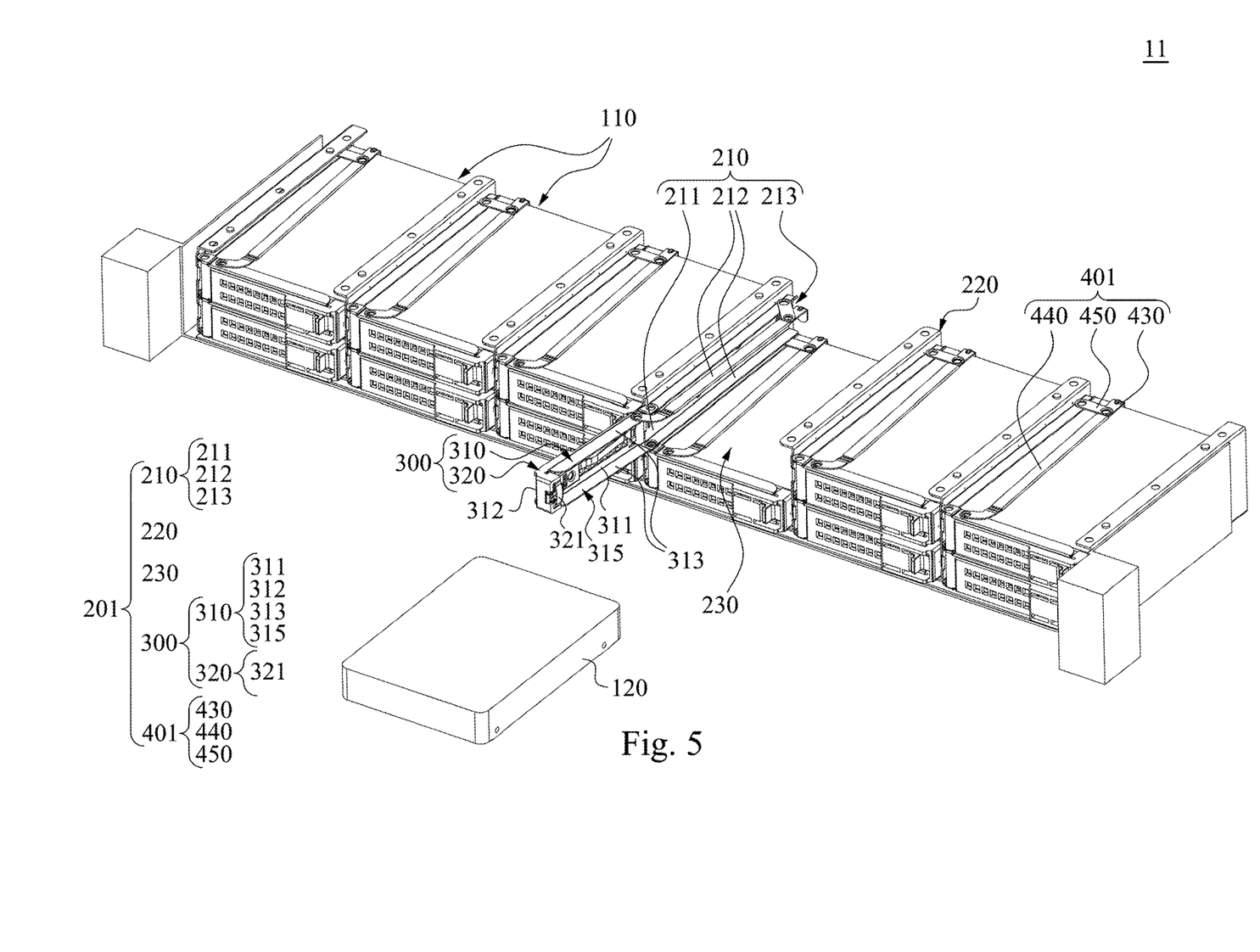
FIG. 5 is a partial exploded view of a server according to one embodiment of the disclosure.
Figure 6:
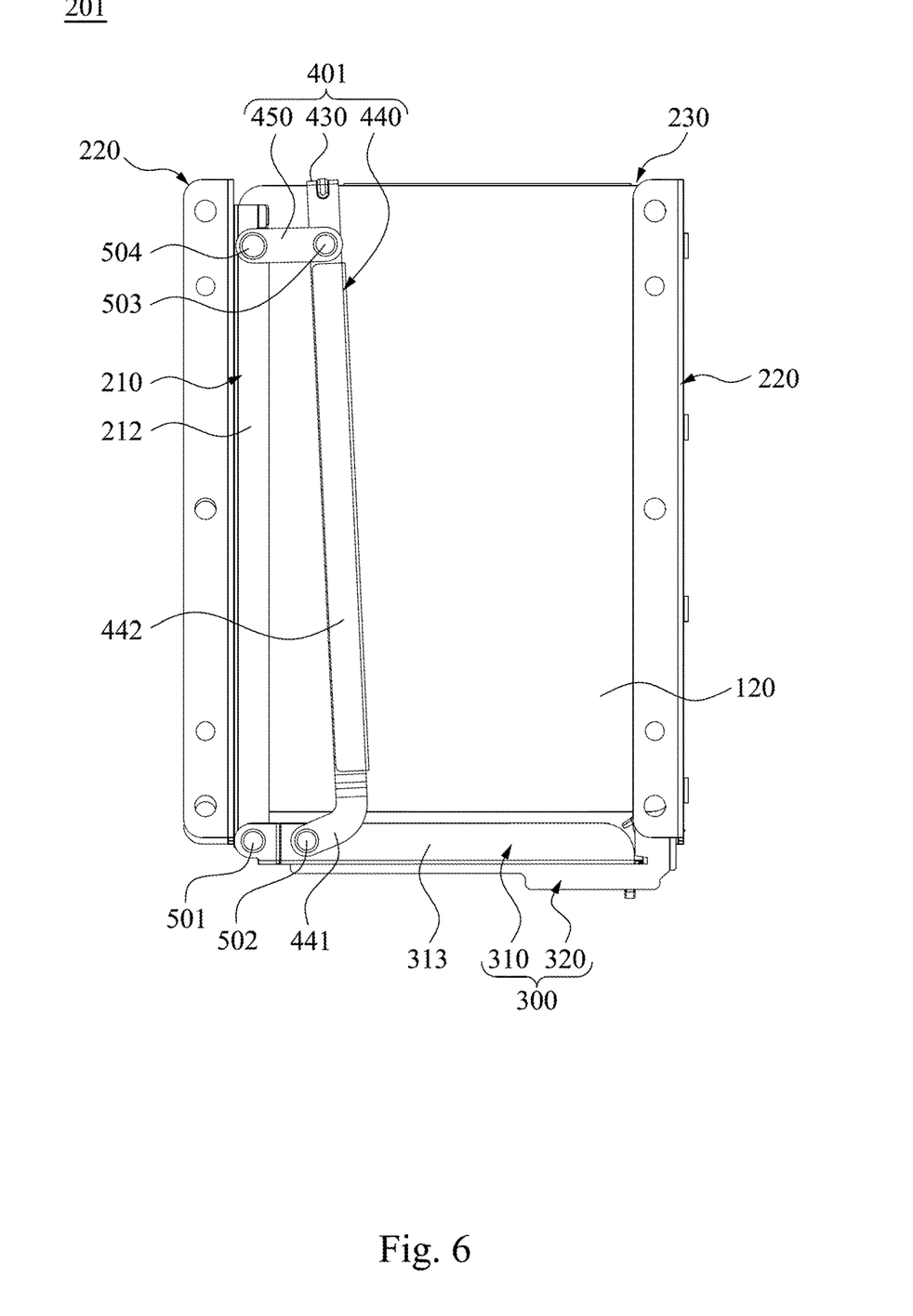
FIG. 6 is a top view of the hard-disk pulling device of FIG. 5.

FIG. 5 is a partial exploded view of a server 11 according to one embodiment of the disclosure, and FIG. 6 is a top view of the hard-disk pulling device 201 of FIG. 5. As shown in FIG. 5 and FIG. 6, in the embodiment, the hard-disk pulling device 201 of this embodiment and the hard-disk pulling device 200 of FIG. 3 are substantially the same, however, at least some differences of the hard-disk pulling device 201 of this embodiment from that in FIG. 3 are that, the second linking rod 450 of the linkage mechanism 401 is formed as a linear rod, rather than an L type body. Also, the first linking rod 440 includes a curved portion 441 and a linear portion 442. The curved portion 441 and the hook portion 430 are respectively located at two opposite ends of the linear portion 442 of the first linking rod 440, and the curved portion 441 is bent towards the first separating plate 210, and pivotally connected to one of the side surfaces 313 of the cover member 300. More particular, the curved portion 441 and the hook portion 430 are directly located at two opposite ends of the first linking rod 440, respectively. For example, the hook portion 430 is a curved structure that is integrally formed at the end of the first linking rod 440.

Figure 7A:
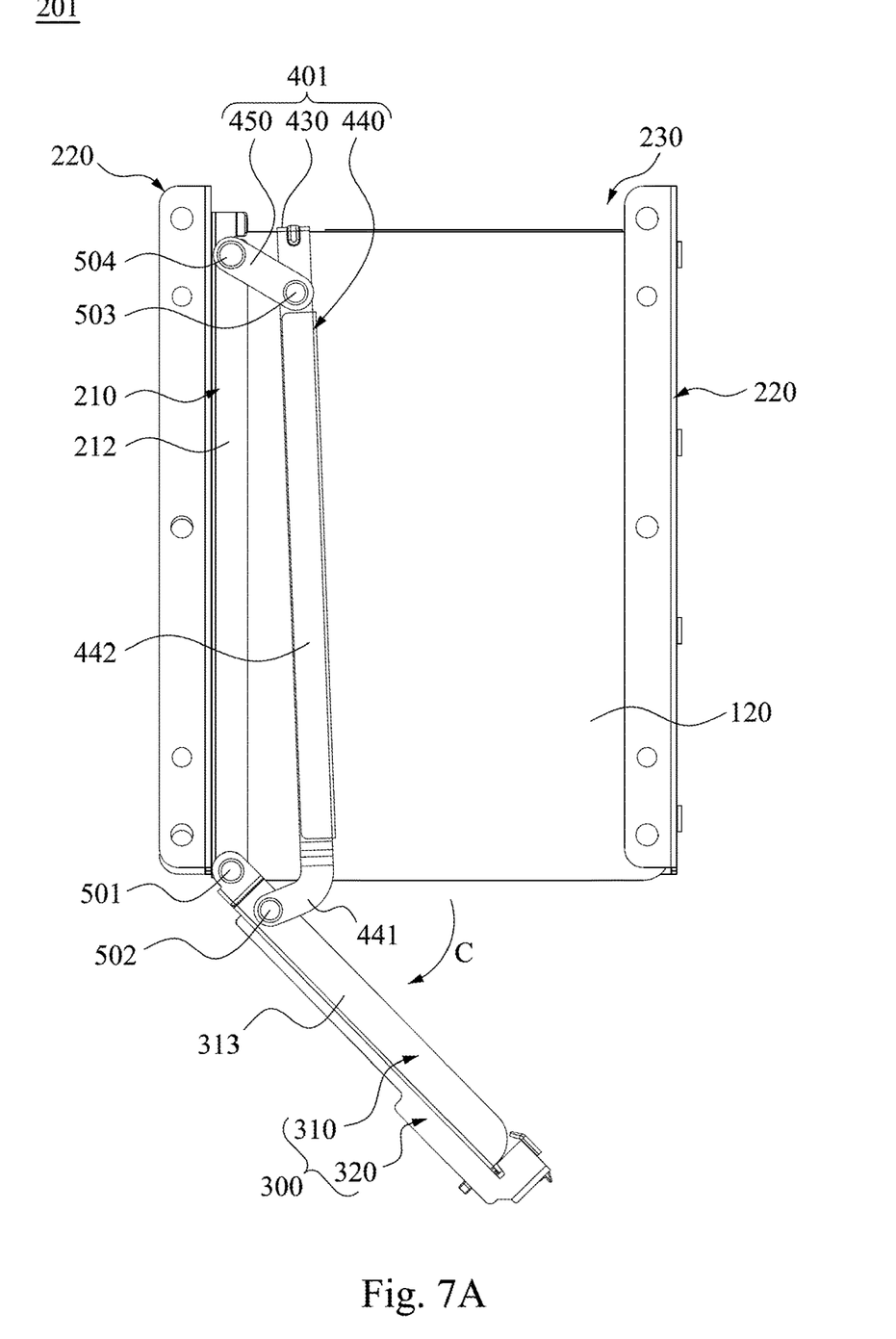
FIG. 7A-FIG. 7B are continuous schematic views expressing the hard-disk pulling device of FIG. 6.

FIG. 7A-FIG. 7B are continuous schematic views expressing the hard-disk pulling device 201 of FIG. 6. As shown in FIG. 6 and FIG. 7A, when the user opens the cover member 300 to rotate the cover member 300 to expose the hard disk unit 120 from the receiving space 230 in a rotation direction C, the cover member 300 pulls the first linking rod 440 and the second linking rod 450, so that the second linking rod 450 matches the moving direction of the cover member 300, that is, the first linking rod 440 is rotated in the rotation direction C, and then the hook portion 430 is pulled, so the hook portion 430 starts to push in the direction of the cover member 300 Hard disk unit 120. The cover member 300 pulls the first linking rod 440 and the second linking rod 450 so that the second linking rod 450 is moved in the moving direction of the cover member 300, that is, the first linking rod 440 is rotated in the rotation direction C so as to pull the hook portion 430. Therefore, the hook portion 430 starts to push the hard disk unit 120 towards the cover member 300.

Figure 7B:
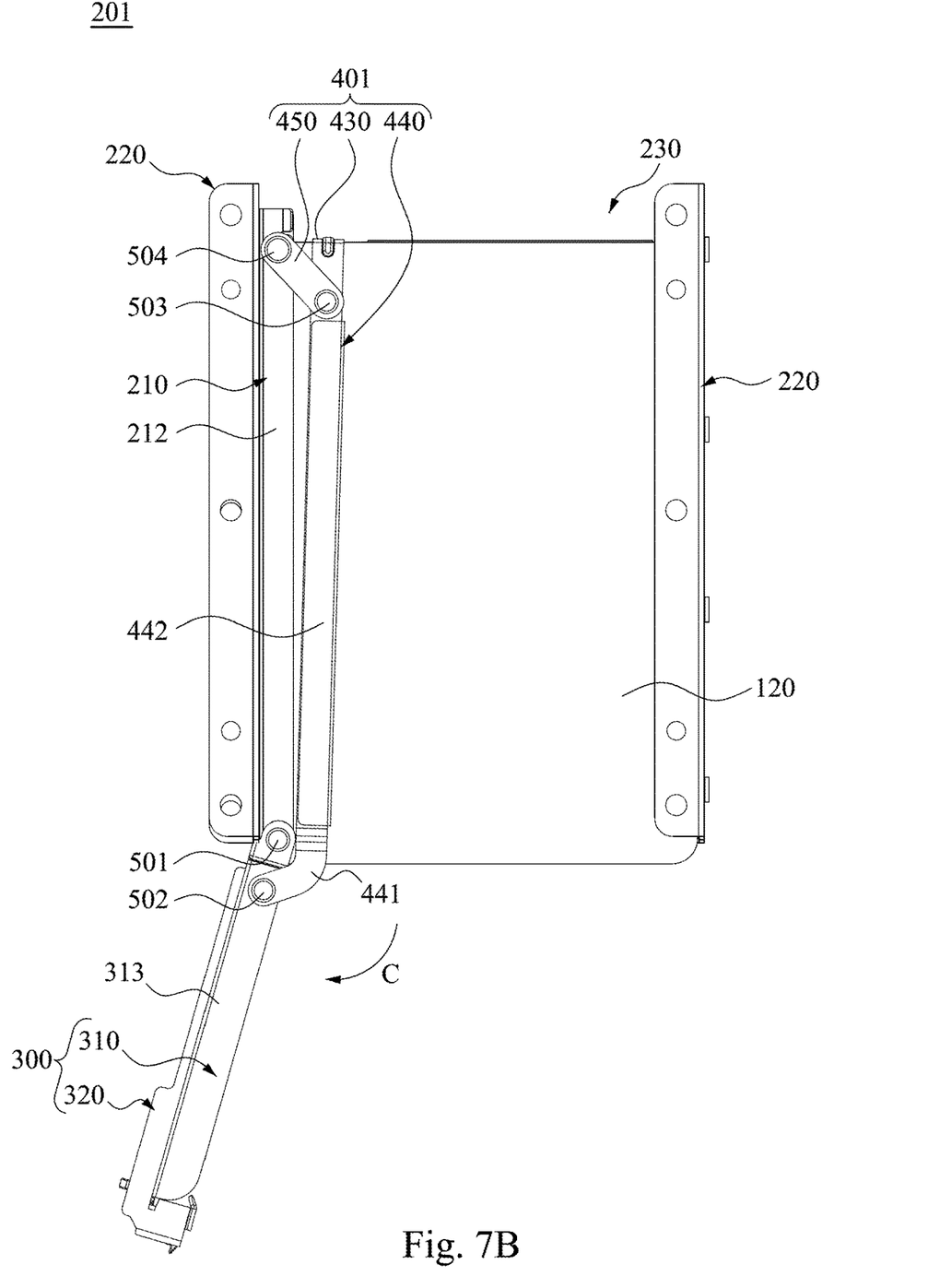

As shown in FIG. 7A and FIG. 7B, when the user continues to rotate the cover member 300 to be further away from the hard disk unit 120 in the receiving space 230, the cover member 300 pulls one part of the hard disk unit 120 out of the receiving space 230 through the first linking rod 440.

More specifically, a plurality of the second separating plate 220 are equidistantly and transversely arranged in the rack 100 along the Y axis, and a plurality of the first separating plates 210 are respectively arranged in the rack 100. In each of the accommodating units 110, two first separating plates 210 are provided. These first separating plates 210 are vertically arranged in the rack 100 along the Z axis, and the first separating plates 210 are attached to the second separating plate 220 of another adjacent accommodating unit 110.

Thus, through the construction of the embodiments above, the hard disk unit can be chosen to operate without a removable tray. Thus, even if the receiving space of the server rack is constant, the above-mentioned hard-disk pulling device can not only facilitate the withdrawing of the hard disk units but also improve the storing capacity of the hard disk units, thereby enhancing the efficiency of the server in providing information access services.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A hard-disk pulling device, comprising:
    a first separating plate;
    a second separating plate in which a receiving space is defined between the first separating plate and the second separating plate for receiving a hard disk unit;
    a cover member pivotally connected to the first separating plate to selectively cover the receiving space;
    a linkage mechanism, comprising:
        a first linking rod pivotally connected to the cover member; and
        a second linking rod pivotally connected to the first linking rod and the first separating plate; and
    a hook portion connected to one end of the linkage mechanism facing away from the cover member for directly abutting against the hard disk unit,
    wherein when the cover member is rotated to expose the hard disk unit received in the receiving space, the cover member pulls the hook portion through the linkage mechanism such that the hook portion pushes the hard disk unit out of the receiving space.

2. The hard-disk pulling device of claim 1, wherein the second linking rod is formed in an L shape, and the second linking rod comprises a first rod body and a second rod body connected to the first rod body, wherein an angle is defined between the first rod body and the second rod body,
    wherein one end of the first rod body facing away from the second rod body is pivotally connected to the first separating plate, and one end of the second rod body facing away from the first rod body is fixedly connected to the hook portion, and one end of the first rod body facing away from the cover member is pivotally connected to an intersection of the first rod body and the second rod body.

3. The hard-disk pulling device of claim 2, wherein the cover member is formed with a lug, the lug is protrudingly located on one side of the cover member, and one end of the first linking rod facing away from the hook portion is pivotally connected to the lug,
    wherein, when the cover member covers the receiving space to conceal the hard disk unit received in the receiving space, the lug is located within the receiving space.

4. The hard-disk pulling device of claim 1, wherein the first separating plate is provided with a first sliding slot, the first sliding slot is disposed on one side of the first separating plate facing towards the receiving space; and
    the second separating plate is provided with a plurality of first protruding posts and a plurality of second protruding posts, the first protruding posts are spaced arranged along a long axis direction of the second separating plate, and the second protruding posts are spaced arranged along the long axis direction of the second separating plate, so that a second sliding slot is defined between the first protruding posts and the second protruding posts, and is arranged opposite to the first sliding slot,
    wherein two opposite sides of the hard disk unit are received and supported in the first sliding slot and the second sliding slot, respectively.

5. The hard-disk pulling device of claim 4, wherein the cover member is provided with a third sliding slot, the third sliding slot is disposed on one side of the cover member facing towards the receiving space,
    wherein, when the cover member partially pushes the hard disk unit out of the receiving space, the first sliding slot is connected to the third sliding slot, and one of the two opposite sides of the hard disk unit is collectively located in the first sliding slot and the third sliding slot.

6. The hard-disk pulling device of claim 5, wherein the cover member has an elastic portion, and the elastic portion is protrudingly located on an inner surface of the cover member,
    wherein, when the cover member covers the receiving space, the elastic portion pushes the hard disk unit into the first sliding slot from the third sliding slot.

7. The hard-disk pulling device of claim 1, wherein the hook portion is located aside an imaginary extension line of a long axis direction of the first linking rod.

8. The hard-disk pulling device of claim 1, wherein the second linking rod is a linear rod, and the hook portion is directly formed at one end of the first linking rod facing away from the cover member.

9. The hard-disk pulling device of claim 8, wherein the cover member is formed with an inner surface and two side surfaces, the inner surface is located between the two side surfaces, wherein, when the cover member covers the receiving space, the inner surface of the cover member faces towards the receiving space; and the first linking rod is provided with a curved portion, the curved portion and the hook portion are respectively located at two opposite ends of the first linking rod, and the curved portion is pivotally connected to one of the two side surfaces of the cover member.

10. The hard-disk pulling device of claim 1, wherein the cover member further comprises a first pivot, and the cover member is pivotally connected to the first separating plate through the first pivot; and the linkage mechanism further comprises a second pivot, a third pivot and a fourth pivot in which the first linking rod is pivotally connected to the cover member through the second pivot, and pivotally connected to the second linking rod through the third pivot, the second linking rod is pivotally connected to the first separating plate through the fourth pivot, so that the first separating plate, the second linking rod, the first linking rod and the cover member are collectively formed to be a four-bar linkage structure.

* * * * *